United States Patent
Cescon

(10) Patent No.: US 7,886,405 B2
(45) Date of Patent: Feb. 15, 2011

(54) SPHERICAL JOINT AND EYEGLASSES WITH SPHERICAL JOINT

(75) Inventor: Stefano Cescon, Maserada sul Piave (IT)

(73) Assignee: Foto Ottica Cescon Di Cescon Stefano, Spresiano (Treviso) (IT)

( * ) Notice: Subject to any disclaimer, the term of this patent is extended or adjusted under 35 U.S.C. 154(b) by 501 days.

(21) Appl. No.: 11/914,712

(22) PCT Filed: May 20, 2005

(86) PCT No.: PCT/IT2005/000287
§ 371 (c)(1), (2), (4) Date: Nov. 16, 2007

(87) PCT Pub. No.: WO2006/123374
PCT Pub. Date: Nov. 23, 2006

(65) Prior Publication Data
US 2008/0201901 A1   Aug. 28, 2008

(51) Int. Cl.
*E05D 7/00* (2006.01)

(52) U.S. Cl. .................................. 16/224; 351/115

(58) Field of Classification Search ............ 16/224, 16/228; 403/132, 135; 384/206, 218; 351/111, 351/113, 114, 115, 118, 120, 121
See application file for complete search history.

(56) References Cited

U.S. PATENT DOCUMENTS

| | | | | |
|---|---|---|---|---|
| 2,526,105 A | * | 10/1950 | Adams | 464/115 |
| 3,476,466 A | * | 11/1969 | Hopkins | 351/115 |
| 3,853,414 A | * | 12/1974 | Hirano et al. | 403/71 |
| 4,109,821 A | * | 8/1978 | Lutz | 220/836 |
| 4,290,181 A | * | 9/1981 | Jackson | 29/458 |
| 4,789,377 A | * | 12/1988 | Hoskins | 464/157 |
| 5,146,649 A | * | 9/1992 | Da Pra' | 16/228 |
| 5,596,789 A | * | 1/1997 | Simioni | 16/228 |
| 5,638,146 A |   | 6/1997 | Nannini | |

(Continued)

FOREIGN PATENT DOCUMENTS

DE   19601248   7/1996

(Continued)

OTHER PUBLICATIONS

International Search Report dated Nov. 15, 2005, for corresponding International Application PCT/IT2005/000287.

*Primary Examiner*—Chuck Y. Mah
(74) *Attorney, Agent, or Firm*—Katten Muchin Rosenman LLP

(57) ABSTRACT

Spheric joint or spherical hinge (30; 130) for coupling together two members that are spatially orientable relative to each other, in which a head (84; 184) of the first member (80; 180) is retained in an accommodation (46; 146) of the second member (40; 140) by at least four points of contact located on a spherical surface according to the vertices of a pyramid containing the centre thereof, about which said head (84; 184) is adapted to rotate without translating. The hinge is characterized in that said accommodation (46; 146) or said head (84; 184) has a projecting boss (52; 152) confined in a gap (85; 186) of said head (84; 184) or said accommodation (46; 146), said gap (85; 186) having at least two consecutive distinct spaces (85a, 85b; 187, 188) that define a travelling path (85; 186) for said boss (52; 152).

22 Claims, 9 Drawing Sheets

U.S. PATENT DOCUMENTS

| | | |
|---|---|---|
| 6,168,341 B1 * | 1/2001 | Chene et al. ............... 403/76 |
| 6,758,622 B2 | 7/2004 | Burton |
| 7,108,447 B2 * | 9/2006 | Akkala et al. ............... 404/25 |
| 2002/0124350 A1 * | 9/2002 | Desbiez-Piat ............... 16/228 |

FOREIGN PATENT DOCUMENTS

| | | |
|---|---|---|
| DE | 19629491 | 1/1998 |
| DE | 10321131 | 4/2005 |
| FR | 2771460 | 5/1999 |
| JP | 1058809 | 3/1989 |
| JP | 11101221 | 4/1999 |
| WO | 9510064 | 4/1995 |
| WO | 9519586 | 7/1995 |

* cited by examiner

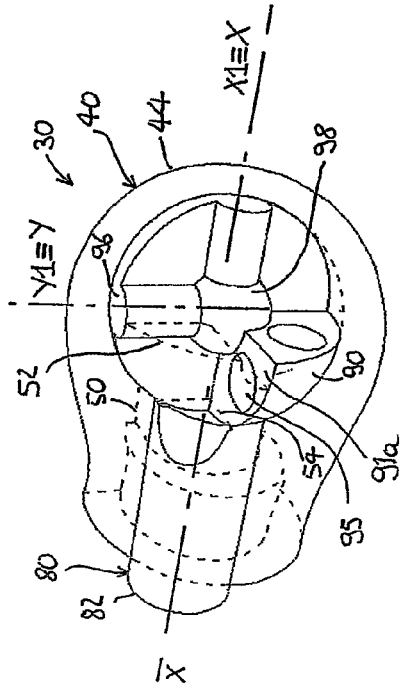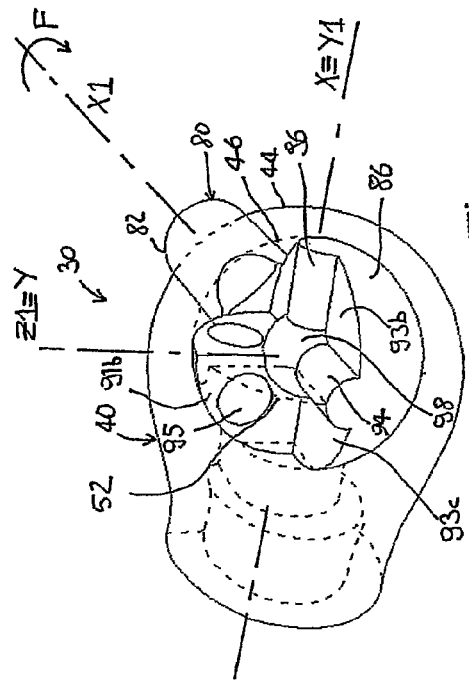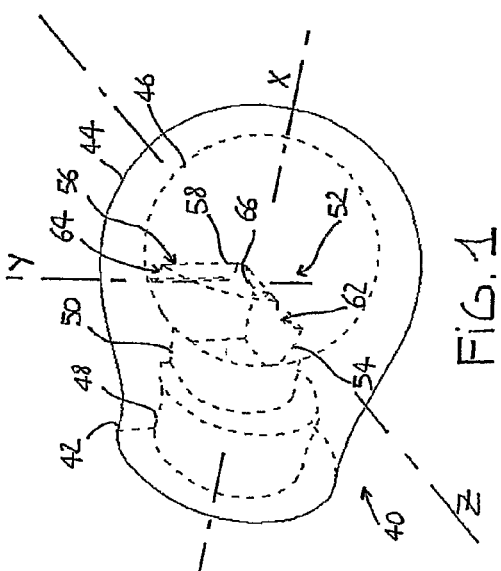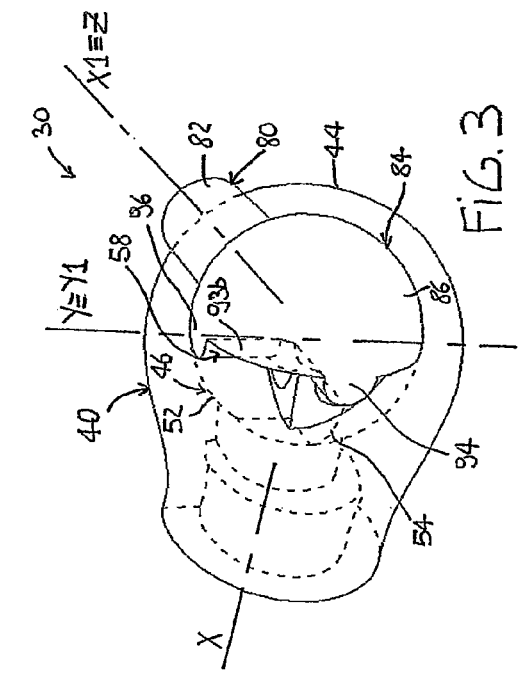

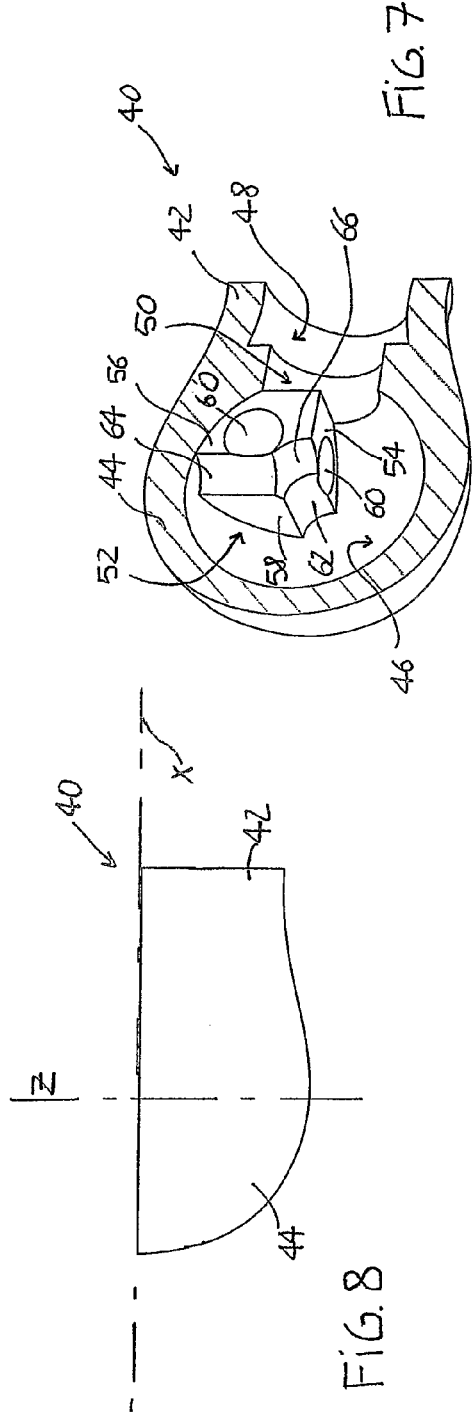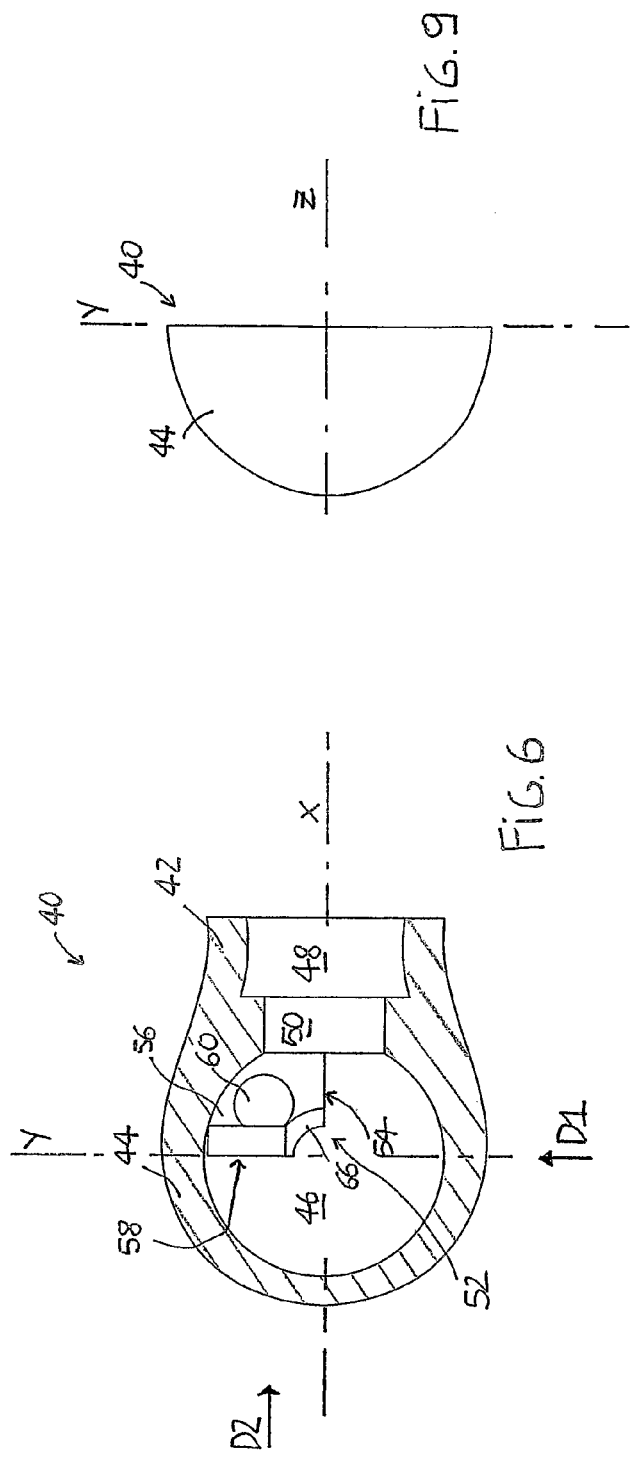

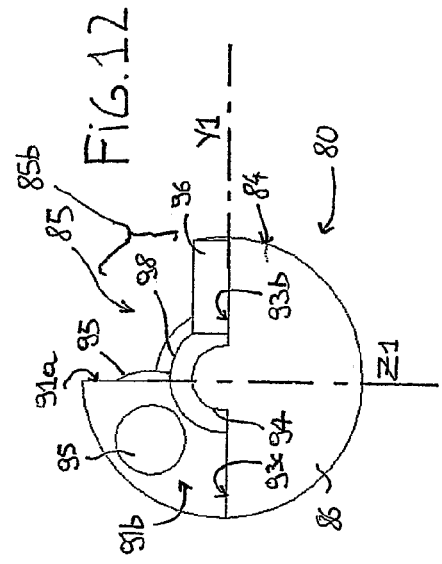
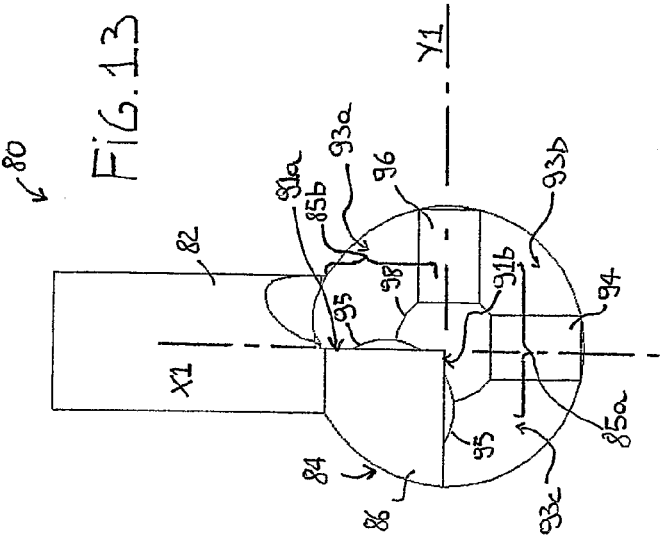
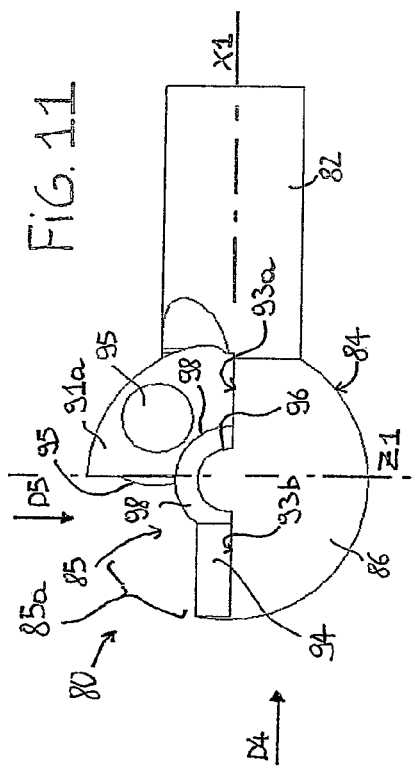
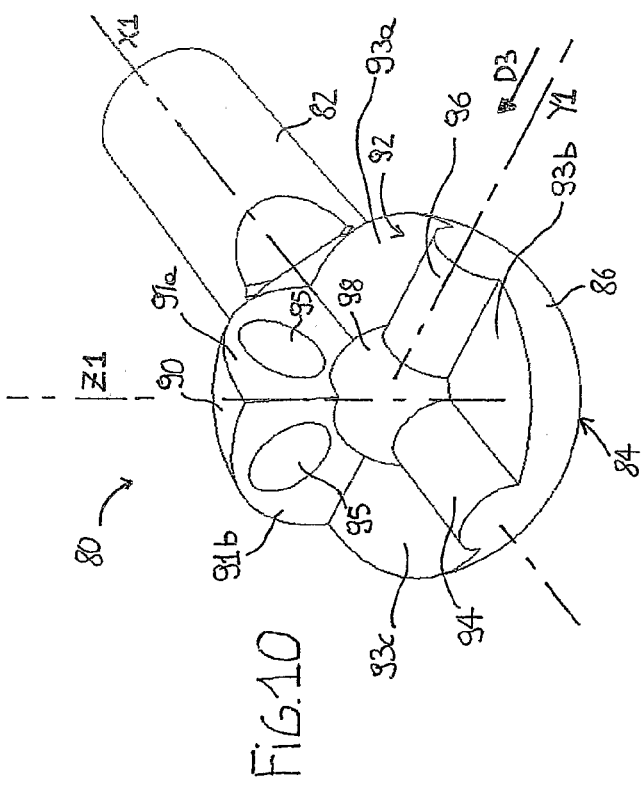

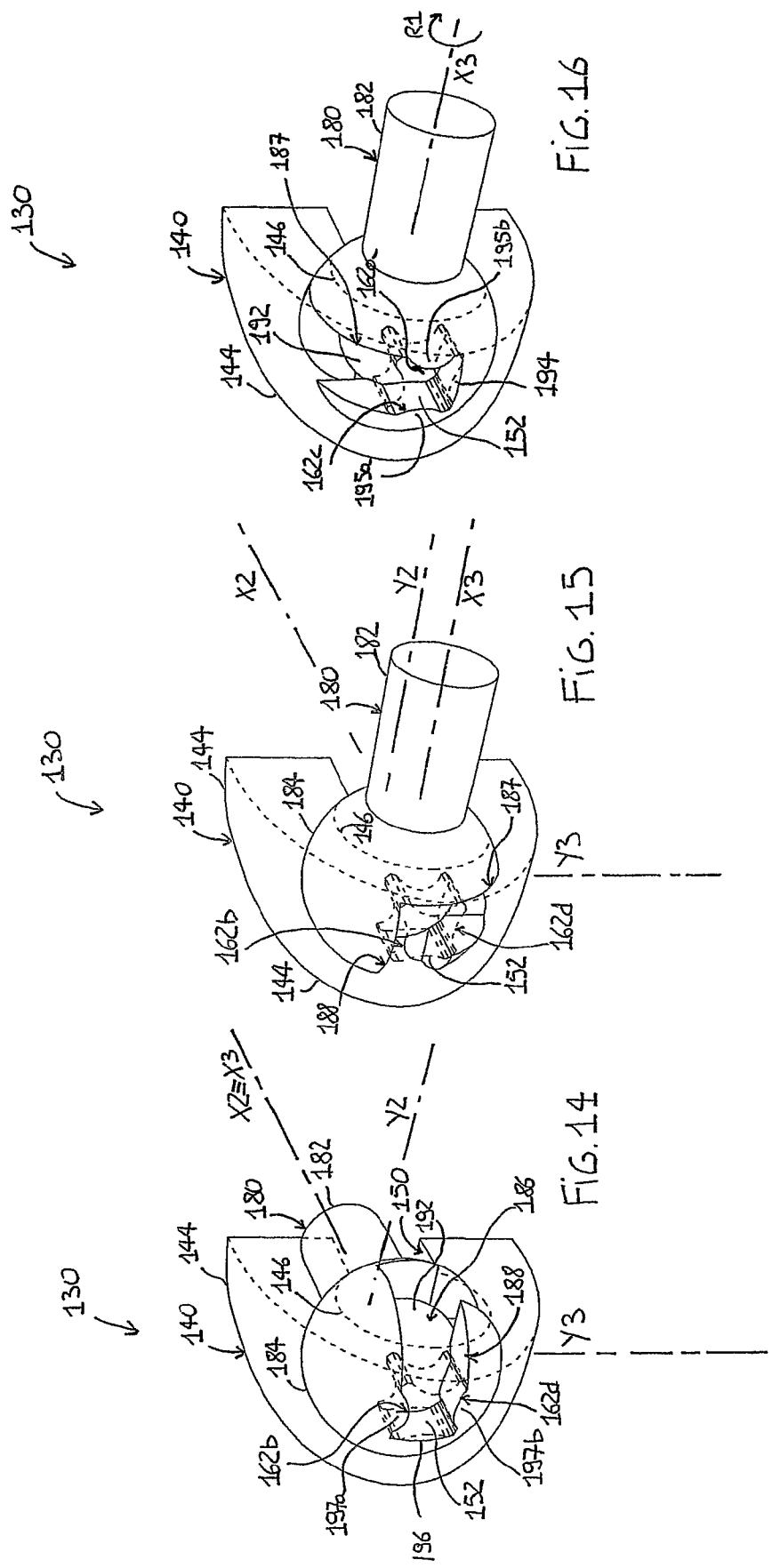

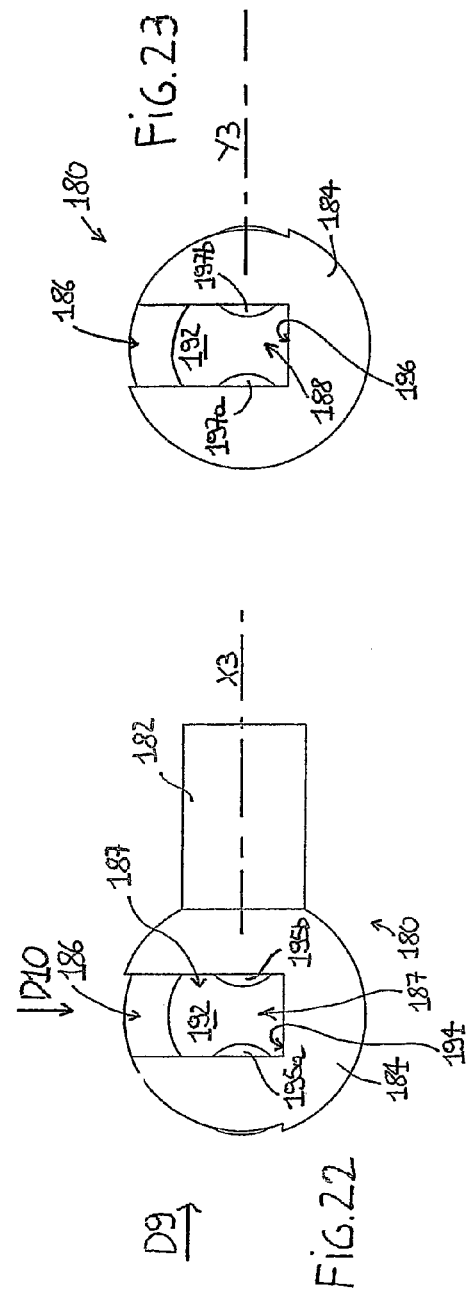
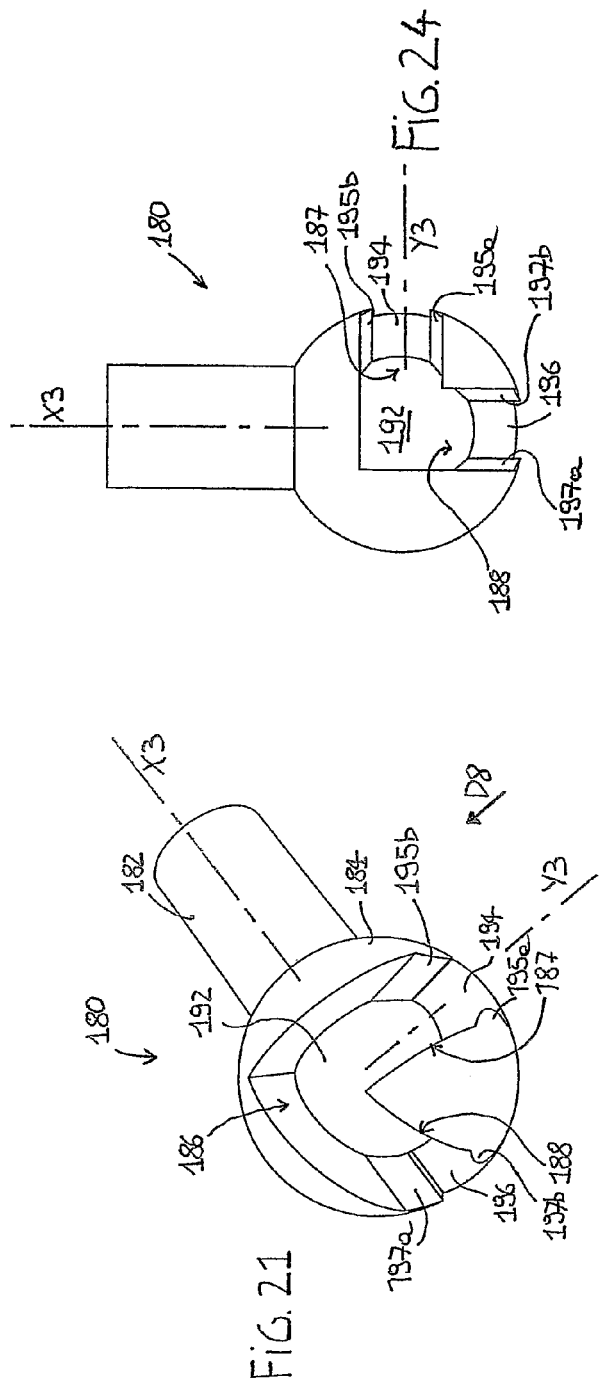

SPHERICAL JOINT AND EYEGLASSES WITH SPHERICAL JOINT

CROSS-REFERENCE TO RELATED APPLICATIONS

This application claims priority to International Application PCT/IT/2005/000287, which was filed May 20, 2005.

BACKGROUND OF THE INVENTION

1. Field of the Invention

The present invention refers to a spheric joint (or spherical hinge), in particular for eyeglasses.

A spherical hinge is by definition a joint that enables two rigid segments, which are connected to each other by the hinge itself, to move relative to each other with three rotational degrees of freedom.

2. Description of the Related Art

Owing to their own peculiarities, spherical hinges are used in a large number of different applications.

Patent application FR 2 771 460 describes a lockable spherical hinge used to mount a table between the seats in an aircraft. This spherical hinge consists of a spherical head accommodated in the spherical cavity of a female counterpart piece. The cavity is formed of two members that are joined with each other by means of a linear hinge on the one side and a securing lever on the other side. These two members are in contact with the spherical head via flexible joints. Although this allows an adjustment along three distinct axes, the hinge locking mechanism is complicated in its construction and rather expensive.

Patent application DE 196 01 248 discloses a spherical hinge for use in underwater flash-lamp supports. This hinge includes a spherical-head member that is enclosed in a corresponding cavity of a support. This member is capable of oscillating within a restricted solid angle, as well as rotating about its own longitudinal axis. However, no possibility exists for the spherical-head member to be locked in a fixed position.

Spherical hinges are largely used also in the spectacles manufacturing industry.

It is in fact a widely known fact that the two arms and the frame of a pair of spectacles are generally connected to each other by means of hinges that allow for the arms to be folded back when the spectacles are not being used. The simplest and most well-known solution in this connection lies in having the arms folded parallel to the frame.

Owing to the increasing aesthetical purport of wear items in general, i.e. items that are intended for wearing, spectacles manufacturers are increasingly concentrating on developing and designing most varied and attractive models of spectacles. In particular, a most promising and lively domain in this connection is the one involving the design of hinges for the two arms of the spectacles.

In this connection, patent application JP 080 68 873 describes a spherical hinge having a loop that is made of a filiform, i.e. wire-like material and is bent according to a three-dimensional pattern so as to retain a sphere both above and below the equatorial plane thereof. The sphere itself is attached to a stem and—relative to the loop, which is fixed on the spectacles frame—this stem is capable of rotating both about itself and by an angle of approx. 180° along a narrow equatorial solid angle. This solution, although doing fully away with the use of screws or other fastening means, does however not enable the stem to be locked in any pre-defined position, thereby giving rise to a number of practical drawbacks.

Disclosed in patent application DE 196 29 491 is a spherical hinge adapted to provide a safety coupling between an arm and a frame. The arm has a spherical head, which is received in a corresponding accommodation in the frame, with a linear groove provided therein, in which a pin-like relief member provided within said accommodation is able to slide. When closing the arm by folding it up on the frame, said pin-like member slides along such groove between the two extremities thereof. The arm cannot rotate about itself and can only span an angle of approx. 90°.

Patent application WO 95/10064 describes spectacles, in which each arm is formed of a short member and a much longer one, the latter practically constituting the actual arm. The short member is hinged both on to the spectacles frame—and is able to rotate about an axis passing through the eyes of the wearer—and the longer member along an axis extending perpendicular to the former one. The overall effect of these two hinges is that the two long members can be folded one above and the other below the frame, thereby obtaining a compact structure for the spectacles. This whole set of hinges, however, implies a quite complex and critical construction, especially as far as the locking system for the position of the two segments is concerned, which relies on a small protrusion engaging into a slot, with the possibility of quite easily slipping off therefrom.

Replacing such an articulation system for the spectacles arms with a more simple and effective one would certainly prove quite advantageous.

It therefore is a major object of the present invention to provide a novel spherical hinge, in particular, although not solely, intended for use for the arms of spectacles in view of allowing them to perform particular motions.

Within this general object, it is another purpose of the present invention to provide a hinge for the arms of spectacles that, while enabling the same motions as the hinge disclosed in WO 95/10064, is far more simple and reliable in its construction.

SUMMARY OF THE INVENTION

According to the present invention, these aims are reached in a spherical hinge for joining with each other two members that are spatially orientable relative to each other, in which a head of the first (male) member is retained in an accommodation in the second (female) member by at least four points of contact located on a spherical surface according to the vertices of a pyramid containing the centre thereof, and about which said head is capable of rotating without translating, characterized in that said accommodation or said head is provided with a protruding boss confined in a gap in said head or said accommodation, said gap featuring at least two consecutive distinct spaces that define a travelling path for said boss.

By embodying the innovative concept of the present invention, for instance in view of allowing said travelling path to guide said head into two subsequent rotations about two distinct axes passing through said centre, and additionally providing so that the two different axes extend orthogonally to each other, a movement is obtained for a member of the hinge that is similar to the one of an arm of the spectacles described in WO 95/10064.

Since the movement of the head of the male member—as particularized in a spectacles arm in this case—takes place, i.e. is performed relative to the corresponding accommodation in the female member—as particularized in a spectacles frame in this case—according to the displacement of the boss, which may for instance be provided to protrude from the surface of said accommodation, and which is constrained into moving (in the same way as a slider) solely inside a void zone in the head, such as for instance a groove or a gap having a pre-established shape, the need only arises for such shape of the gap to be suitably designed to define and set the actual movements that the head is allowed to perform relative to the accommodation and, as a result, the support in which it is received. It will be most readily appreciated in this connection that the task of acting as the male and female member can be exchanged, wherein the first one is kept stationary and the other one is movable, or the protruding boss may be provided on the head and the gap in the surface of the accommodation.

Since the hinge according to the present invention is basically comprised of two members, in which the shape of the related interacting parts determines the movements that the same hinge is allowed to perform, and since said parts may be first moulded and then snap-fitted or similarly assembled together, no fastening means, such as screws or the like, are actually needed, thereby simplifying the hinge construction to a great extent.

Since the hinge according to the present invention is composed by two elements whose form of the interacting parts determines the allowed movements to the hinge itself, and said parts may be produced by stamping and then hot-assembled, fastening means as screws or the like are not necessary. A great simplicity of production is therefore achieved.

Since the hinge may be locked and secured together by interference of the protruding boss with the walls of the gap, by appropriately sizing said boss and said gap it is possible for an optimum stability and strength to be imparted to the hinge.

BRIEF DESCRIPTION OF THE DRAWING

Features and advantages of a hinge according to the present invention may anyway be more readily understood from the description that is given below by way of an example with reference to the accompanying drawings, in which:

FIG. 1 is a view of a first member of a first hinge according to the present invention;

FIGS. 2 to 4 are respective views of a sequence of three positions of the first hinge according to the present invention;

FIG. 6 is a cross-sectional view of the member shown in FIG. 1, as viewed along the plane I-I in FIG. 5b;

FIG. 7 is an axonometric view of the cross-sectioned member shown in FIG. 6;

FIG. 8 is a cross-sectional view of the member shown in FIG. 6, as viewed in the direction D1 in FIG. 6;

FIG. 9 is a cross-sectional view of the member shown in FIG. 6, as viewed in the direction D2 in FIG. 6;

FIG. 10 is an axonometric view of a male member of the first hinge shown in FIGS. 2 to 4;

FIG. 11 is a view of the member shown in FIG. 10, as viewed in the direction D3 in FIG. 10;

FIG. 12 is a view of the member shown in FIG. 10, as viewed in the direction D4 in FIG. 11;

FIG. 13 is a view of the member shown in FIG. 10, as viewed in the direction D5 in FIG. 11;

FIGS. 14 to 16 are see-through views of the sequence of three positions of a second binge according to the present invention;

FIG. 21 is an axonometric view of a male member of the hinge shown in FIGS. 14 to 16;

FIG. 22 is a view of the member shown in FIG. 21, as viewed in the direction D8 in FIG. 21;

FIG. 23 is a view of the member shown in FIG. 22, as viewed in the direction D9 in FIG. 22;

FIG. 24 is a view of the member shown in FIG. 22, as viewed in the direction D10 in FIG. 22;

DETAILED DESCRIPTION OF THE INVENTION

In FIGS. 2 to 4 and FIGS. 5b, c, d, a first hinge according to the present invention is generally indicated at 30. It comprises a support female member 40 in the shape of a half-shell, in which there is accommodated a male member 80 having a spherical head.

Figure 5A:
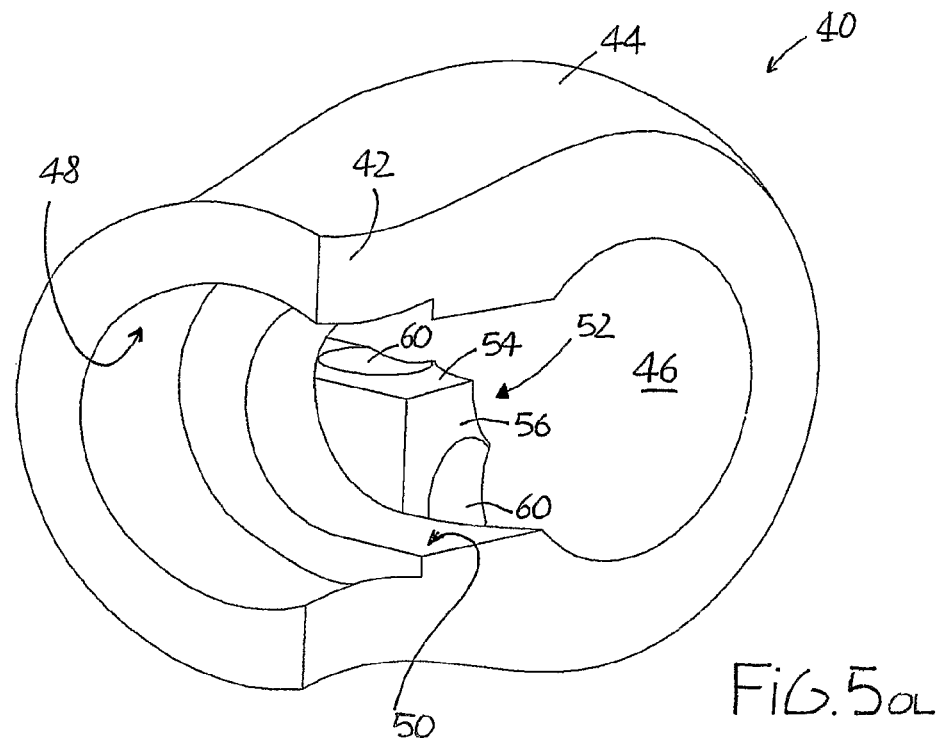
FIG. 5a is a side view of the hinge member of FIG. 1, as viewed from the side that is not visible in FIG. 1.

The support member 40—as shown individually in FIGS. 5 through to 9—comprises a semi-circular collar 42 joined to a half-shell 44 featuring an accommodation 46 in the shape of a spherical segment with a height that is greater than the radius, i.e. in a shape resembling a sphere lacking the volume of a cap. The collar 42 has a semi-circular cavity 48 that extends axially—along an axis X—and communicates with the accommodation 46 via a semi-circular aperture 50 having a smaller radius than the semi-circular cavity 48 of the collar 42. It should be noticed that—by construction—the centre of the accommodation 46 lies on the axis X.

Within the accommodation 46 of the half-shell 44 there protrudes from the surface thereof, dose to the aperture 50, a boss 52. This boss 52 substantially occupies the volume of half a right-angle spherical sector, i.e. an eighth of the sphere generating the accommodation 46, so that it has three fully exposed faces 54, 56, 58 that belong to three mutually perpendicular planes. The faces 54 and 56 are parallel to the axis X, while the face 58 is perpendicular to this axis and parallel to another axis Y. A further axis Z is perpendicular to the plane identified by the axes X and Y.

Each one of the faces 54 and 56 has a recess 60, whereas the edges of the boss 50 that are not parallel to the axis X are not sharp, but rather so shaped as to define walls 62, 64 that are concave and convergent towards a concave surface 66.

The member 80—see FIGS. 10 to 13—comprises a body 82 elongating along a longitudinal axis X1 and a head 84. The head 84 is provided with a surface gap 85, so that it may be considered as being formed by a semi-sphere 86 and half a right-angle spherical sector 90 (one fourth—or quarter—of the semi-sphere 86 or, equivalently, one spherical eighth of the complete sphere that would form the head 84) placed upon each other: therefore, said gap 85 is formed by a tight-angle spherical wedge 85*a* and an eighth of a sphere 85*b*—see FIGS. 11, 12 and 13. The right-angle spherical sector 90 has two plane faces 91*a*, 91*b* extending orthogonally to each other, in each one of which there is provided a convex protrusion 95 (hence, the gap 85 is equal to ⅜ of the complete sphere that would form the head 84). The semi-sphere 86 has an equatorial surface 92, which lies on a plane identified by the axis X1 and an axis Y1 perpendicular thereto, and from which there extend orthogonally the half spherical sector 90 and two semi-cylindrical ribs 94, 96 that are perpendicular to each other and parallel to the axes X1 and Y1, respectively. These ribs are radially convergent into a central semi-sphere 98 that is partially contained in the boss 90. As a result, of the equatorial surface 92 there are exposed three quadrants 93*a*, 93*b* and 93*c*, whereas the faces 91*a*, 91*b* of the boss 90 are perpendicular to the surface 92 and parallel to an axis Z1 that turns therefore out as being perpendicular to the axes X1 and Y1.

Referring now to FIGS. 2 to 4 and 5*b* to 5*d*, in which the member 40 is stationary, i.e. keeps a stationary position, the operation of the hinge 30 is described below. While FIG. 1 illustrates the support member 40 in a separated condition, i.e. individually, in FIG. 2 this support member 40 is shown in a condition in which it is coupled to the spherical-head member 80 (this coupling may for instance take place by hot-joining techniques during manufacturing). The spherical head 84 is received in the accommodation 46 of the half-shell 44. The diameter of the head 84 is slightly smaller than the diameter of the accommodation 46, so that the head 84 is able to rotate about its own centre—which however keeps stationary—within said accommodation 46.

Figures 5B, 5C, 5D:
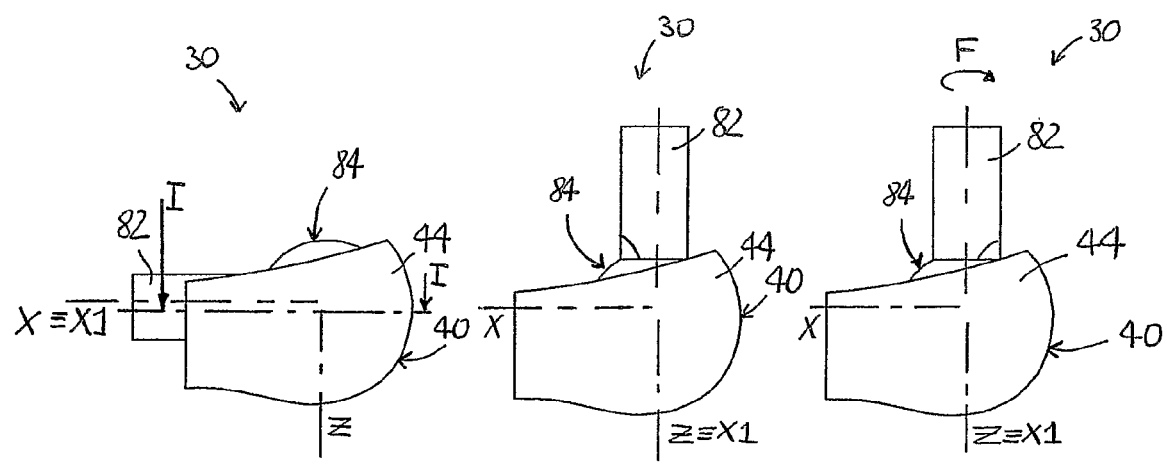
FIG. 5b is a view of the hinge of FIG. 2 along the axis Y in FIG. 2.
FIG. 5c is a view of the hinge of FIG. 3 along the axis Y in FIG. 3.
FIG. 5d is a view of the hinge of FIG. 4 along the axis Y in FIG. 4.
Figure 19:
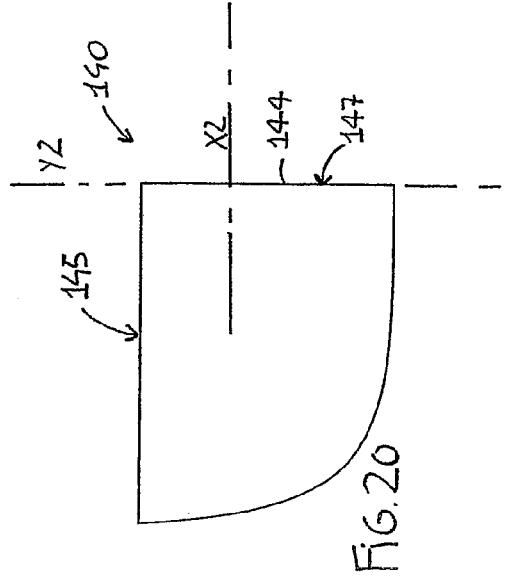
FIG. 19 is a view of the member shown in FIG. 17, as viewed in the direction D6 in FIG. 17.
Figure 20:
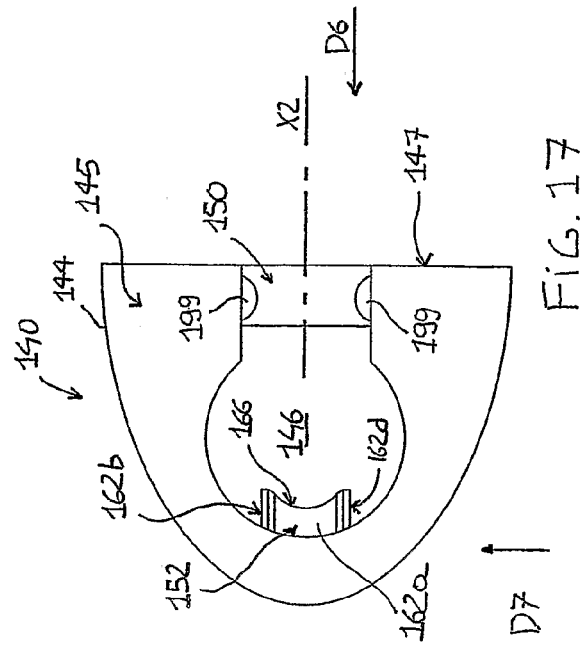
FIG. 20 is a view of the member shown in FIG. 17, as viewed in the direction D7 in FIG. 17.
Figure 18:
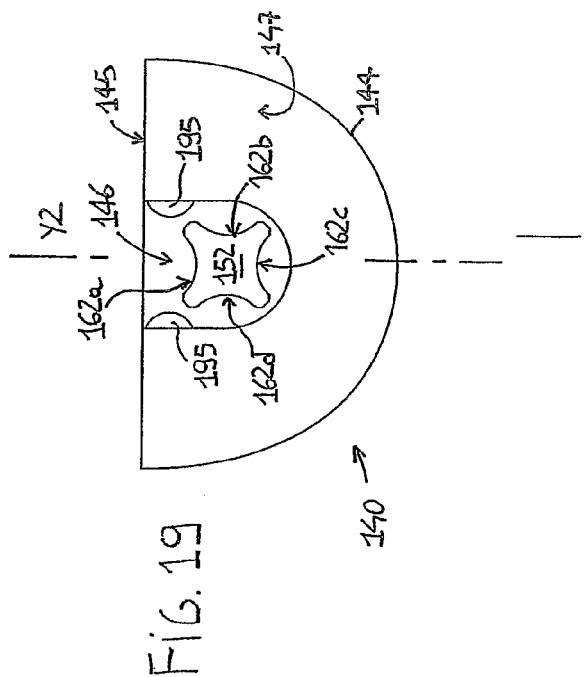
FIG. 18 is an axonometric view of the member shown in FIG. 17.
Figure 17:
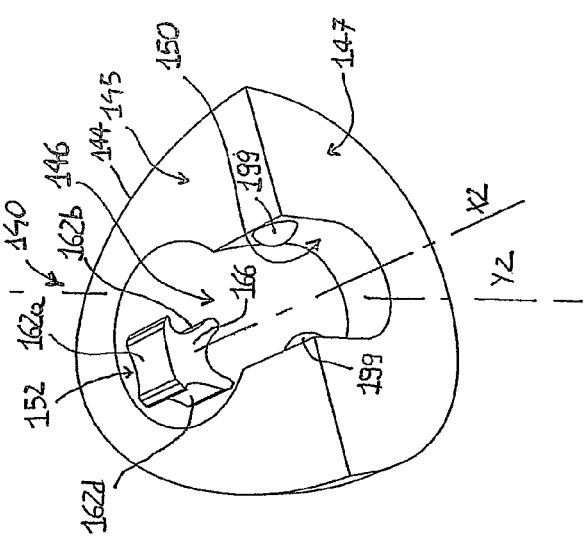
FIG. 17 is a view of a female member of the hinge shown in FIGS. 14 to 16.

Basically, the hinge 30 allows for three working positions, of which two are stable and one transitional. FIGS. 2 and 5*b* show the first one of said stable positions. The elongated body 82 of the member 80 extends through the semi-circular aperture 50, which has a corresponding diameter (it is to be noticed that the axes X, X1 and the axes Y, Y1 ate coincident), whereas the face 91*a* of the half spherical sector 90 is abutting against the face 54 of the boss 52. The protrusion 95 of the face 91*a* is so sized and shaped as to fittingly correspond to the recess 60 in the face 54, in which it gets inserted. This fact further to the elongated body 82 testing against the semi-circular aperture 50 contributes to keeping the two members 40, 80 in a stable position relative to each other.

FIGS. 3 and 5*c* illustrate the transitional position. The member 80 is rotated by 90° in the clockwise direction about the axis Y1 relative to the member 40, by moving in the plane XZ. The spherical head 84 has undergone a similar rotation in the accommodation 46 and, in this new position, it is no longer abutting against the face 54 of the boss 52, which is now in a disengaged condition, while an abutment takes however place between the face 58 of the boss 52 and the quadrant 93*b* of the semi-sphere 86.

The second stable position is illustrated in FIGS. 4 and 5*d*. The entire member 80 is rotated about its longitudinal axis X1 by 90° in the clockwise direction, i.e. the direction indicated at F in FIGS. 4 and 5*d*. The abutments inside the accommodation 46 change again: at this point there is in fact an abutment of the face 54 of the boss 52 against the quadrant 93*c* of the semi-sphere 86 and another abutment of the side 56 of the boss 52 against the face 91*b* of the boss 90. Again, the protrusion 95 of the face 91*b*, which is so sized and shaped as to fittingly correspond to the recess 60 in the side 56, fits thereinto, thereby favouring a greater stability of the two members 40, 80 relative to each other.

From the above description it can be readily appreciated that the boss 52 is confined within, i.e. retained in the gap 85, which features two consecutive distinct spaces, i.e. the portions of sphere 85*a*, 85*b*, that define a travelling path for said boss 52 as the head 84 and the half-shell 44 move relative to each other. As a result, this guided travelling path of the boss 52 guides in tutu the head 84, thereby defining the movements that it is allowed to perform relative to the half-shell 44.

The accuracy of both the three above-described positions and the movements of the member 80 is favoured not only by an accordingly adequate clearance being provided between the accommodation 46 and the head 84, but also by a couple of other factors. The first one of these factors is the stabilizing way in which the face 91*a* of the half spherical sector 90 scrapes along the face 54 of the boss 52 during the first rotation, which is helpful in keeping the member 80 in the plane XZ, and the way in which the middle semi-sphere 98 of the member 40 permanently scrapes along the concave surface 66—featuring a corresponding radius of curvature—of the boss 52. The other factor is given by the ribs 94, 96 of the member 40 fitting in the walls 62, 64—featuring a corresponding concavity—of the boss 52.

In FIGS. 14 to 16, a hinge according to a second embodiment of the present invention is indicated at 130 and shown in a see-through view in order to better illustrate the inner details thereof. This hinge comprises a female support member 140 in the form of a half-shell, in which there is received a male member 180 having a spherical head.

The support member 140—which is shown separately in FIGS. 17 to 20—comprises a half-shell 144 that is provided, in a plane surface 145 thereof, with an accommodation 146 in the shape of a spherical member having a height greater than the radius, i.e. a shape resembling a sphere lacking the volume of a cap. The accommodation 146 communicates axially—along an axis X2 extending parallel to said surface 145—with a semi-circular aperture 150, which has a smaller radius than the accommodation 146 and opens onto a second surface 147 of the half-shell 144 that is orthogonal to the above-mentioned first surface and extends parallel to an axis Y2 contained therein. On the edges of the aperture 150 there are provided, two convex projections 199 in a diametrically opposed arrangement relative to each other. It should be noticed that—by construction—the centre of the accommodation 146 lies on the axis X2 and the surface 145 is orthogonal to the axis Y2.

Inside the accommodation 146, and protruding from the surface thereof, there is provided—in a position opposite to the aperture 150—a boss 152 having a substantially regular cross-sectional shape of a square with concave sides. Therefore, this boss 152 comprises four concave side walls 162*a*, *b*, *c*, *d* that are convergent towards a concave terminal surface 166.

The spherical-head member 180—see FIGS. 21 to 24—comprises a body 182 elongating along a longitudinal axis X3, and a head 184. The head 184 is provided with a continuous surface gap 186 consisting of two equatorial grooves 187, 188, each one of which extends—orthogonal to each other—by an arc of approx. 90°. Since these grooves 187, 188 have a constant radial depth, the bottom thereof practically forms a spherical zone 192 belonging to a sphere having a smaller radius than the head 184, while the two extremities thereof define two radial walls 194, 196. By construction, the radial wall 196 is parallel to the axis X3, while the radial wall 194 is parallel to an axis Y3 that is orthogonal to the axis X3. Close to these radial walls 194, 196 there are provided two convex protrusions 195*a*, *b* and 197*a*, *b*, respectively.

With reference to FIGS. 14 to 16, the operation of the hinge 130 is now described. FIG. 14 illustrates the support member 140 in a condition in which it is coupled to the spherical-head member 180 (this coupling may for instance take place by hot-joining techniques during manufacturing). The spherical head 184 is received in the accommodation 146 of the half-shell 144. The diameter of the head 184 is slightly smaller than the diameter of the accommodation 146, so that the head 184 is able to rotate within said accommodation 146 about its own centre—which however keeps stationary—without slipping off or, anyway, coming out of the same accommodation 146.

Basically, also the hinge 130 allows for three working positions, of which two are stable and one transitional. FIG. 14 shows the first one of said stable positions. The elongated body 182 of the member 180 extends through the semi-circular aperture 150, which has a corresponding diameter (it is to be noticed that the axis X2 and the axis X3 are coincident, whereas the axis Y3 is orthogonal to the axes X2 and Y2), whereas the boss 152 fits into the surface gap 186, in particular into the groove 188. It should be noticed that the two protrusions 197a, b of the head 184 are received into the corresponding concave walls 162b, d provided on the boss 152 (which they move out of and snap in by elastic deformation following a slight pressure), while the boss 152 itself is dose to the radial wall 196 of the groove 188. This fact, further to the elongated body 182 abutting against the projections 199 of the semi-circular aperture 150 contributes to keeping the two members 140, 180 in a stable position relative to each other.

FIG. 15 illustrates the transitional position. The member 180 is rotated by 90° in the clockwise direction about the axis Y3 relative to the member 140 in the plane X2-Y2, thereby moving into a position in which it is orthogonal to the surface 145 and parallel to the axis Y2. The spherical head 184 has undergone a similar rotation in the accommodation 146 (the two protrusions 197a, b of the head 184 have moved out of the corresponding concave walls 162b, d) and, in this new position, the boss 152, after having moved along the entire groove 188, lies now at the corner formed by the two grooves 188 and 187. It should be noticed that the axes Y2 and X3 are now parallel to each other.

The second stable position is illustrated in FIG. 16. The entire member 180 is rotated about its longitudinal axis X3 by 90° in the clockwise direction, i.e. the rotation indicated R1 in FIG. 16. The boss 152, after having moved along the entire groove 187, is now close to the radial wall 194 of the same groove 187. The two protrusions 195a, b of the head 184 are now received into the corresponding concave walls 162c, 162a provided on the boss 152 (into which they have entered by elastic deformation following a slight pressure exerted upon them). This is effective in keeping the two members 140, 180 in a stable position relative to each other.

From the above description it can be readily appreciated that the boss 152 is confined within, i.e. retained in the gap 186, which features two consecutive distinct spaces, i.e. the grooves 187 and 188, that define a travelling path for said boss 152 as the head 184 and the half-shell 144 move relative to each other. As a result, this guided travelling path of the boss 152 guides in turn the head 184, thereby defining the movements that it is allowed to perform relative to the half-shell 144.

The accuracy of both the three above-described positions and the movements of the member 180 is favoured not only by an adequately small clearance being provided between the accommodation 146 and the head 184, but also by four other factors. The first one of these factors is the stabilizing way in which the boss 152 is confined within the groove 188 during the first rotation, which is effective in keeping the member 180 in the plane X2-Y2, and within the groove 187 during the second rotation. The second factor is the protrusions 195a, b and 197a, b of the head 184 fitting in the corresponding concave walls 162a, b, c, d of the boss 152, while the third factor is represented by the concave surface 166 coupling with the spherical surface 192 in contact with each other. Finally, the fourth factor is the body 182 and the projections 199 engaging each other in the position in which said body 182 lies in the aperture 150 (FIG. 14).

Figure 25:
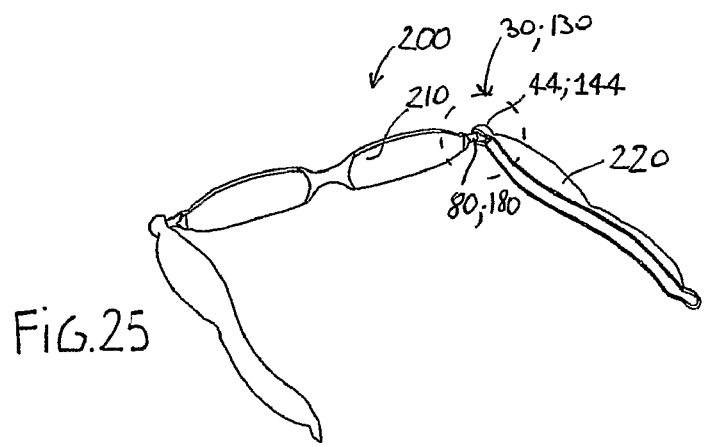
FIGS. 25 to 27 are respective views of a sequence of three positions of an arm of spectacles integrating a hinge according to the present invention.
Figure 26:
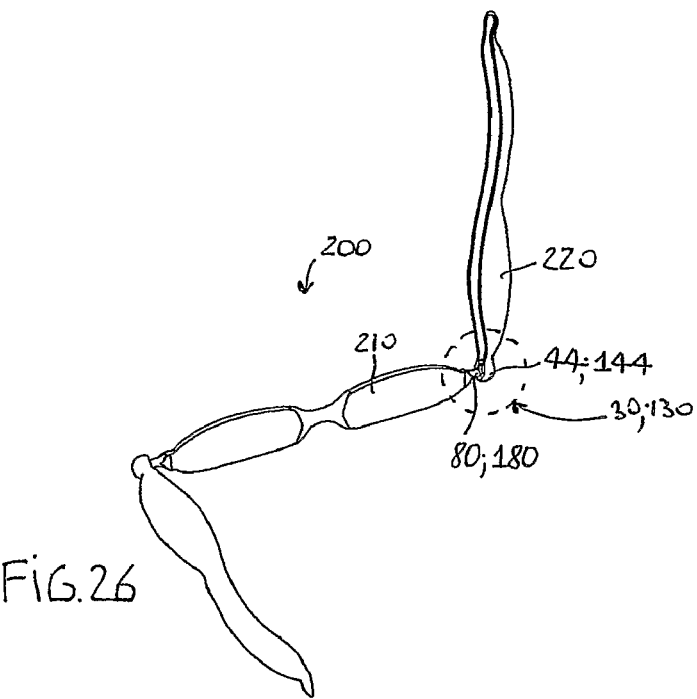
Figure 27:
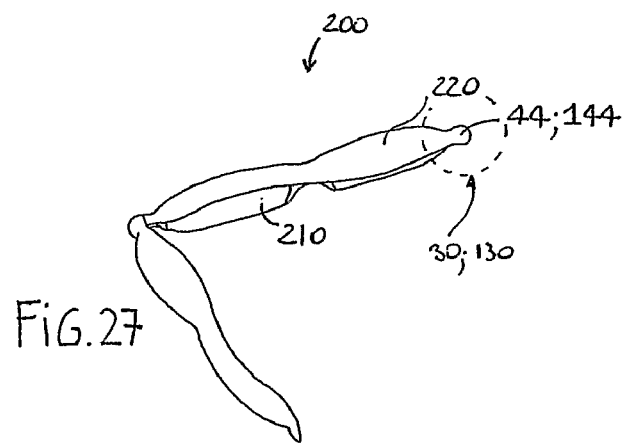

As an example of application of the two above-described hinges according to the present invention, reference should now be made to the illustrations appearing in FIGS. 25 to 27. These Figures show the sequence of three movements performed by an arm 220 of a pair of spectacles 200 relative to a front piece 210 carrying the lenses of the same spectacles (the other arm comprises a similar hinge allowing it to perform a similar movement to be brought under the first arm). The member 40 (or 140) is the same arm 220, wherein at the end portion thereof there is integrated (moulded integrally therewith, in a most advantageous manner) the shell 44 (or 144), whereas the spherical-head member 80 (or 180) is integrated at the sides of the front piece 210—see portions circled with a dashed line in the Figures. The simplicity in practically embodying a hinge capable of ensuring such a complex set of movements can be readily and fully appreciated from these illustrations.

Another possible embodiment of the present invention may contemplate the provision of a boss on the spherical head for engagement in a surface groove provided in the related accommodation of the support member, in which such spherical head is received. Those skilled in the art will be fully able to readily appreciate how the contrivances and devices used in the two afore described embodiments of the hinge according to the present invention can be transferred to this constructive variant thereof without any difficulty.

In addition, the movement of the spherical head may be more complex than the above-described one, by practically involving more than two rotations along equators of the same head, with different spatial angles, stable positions and transitional positions. The gap provided in the spherical head may in general be equal to any fraction whatsoever of a spherical segment, while said boss may itself be a corresponding fraction of spherical segment of a smaller size, so as to be able to move freely within the gap.

Figure 28:
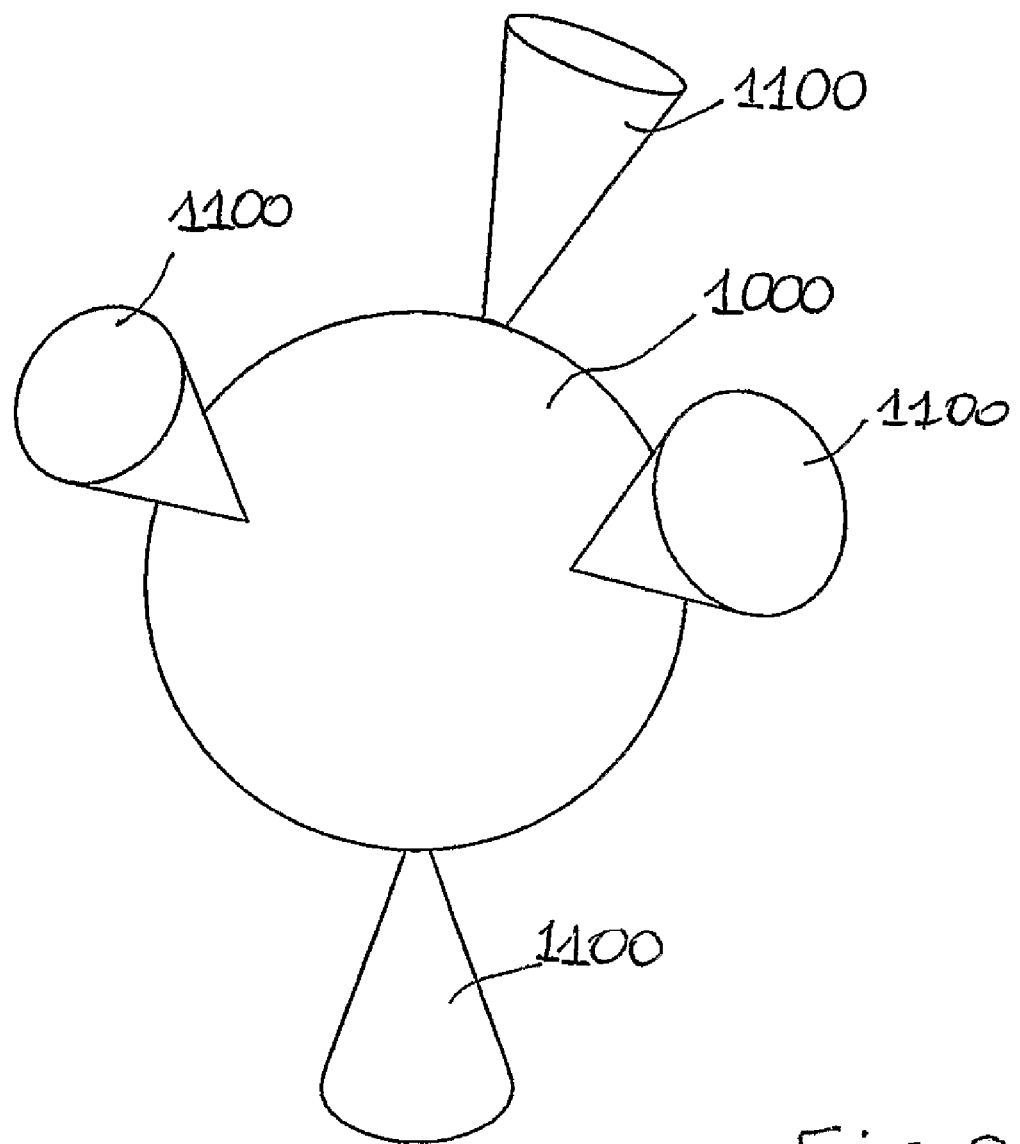
FIG. 28 is a general view illustrating a spherical head retained by at least four contact points located on a spherical surface according to the vertices of a pyramid containing the centre thereof.

The condition according to which the head of the male member has to be retained in a corresponding accommodation of the female member by at least four points of contact located on a spherical surface according to the vertices of a pyramid containing the centre thereof, is a geometrical constraint for the structure of the accommodation, as determined by the requirement that the head be able to rotate about its centre without translating. There are therefore a number of different embodiments that can be contemplated for the accommodation intended to receive the spherical head. The spherical surface is most obviously an ideal one, which anyway does by no means need to be implemented in the form of a material surface as this is the case in the afore-described embodiments, since four testing points may for instance prove fully adequate and sufficient to the purpose—see FIG. 28. In this case, a spherical head 1000 of a male member (not shown) is prevented from translating by four conical teeth 1100 provided on the female member (not shown) according to the vertices of a pyramid with a triangular base.

Various different embodiments and variants thereof may be contemplated for a hinge according to the present invention, as anyone skilled in the art will be fully capable of devising in view of adapting the hinge to a particular application or complying with particular needs. In particular, the male member 80, 180 and female member 40, 140 may be given different complementary or accessory shapes with respect to the articulated core of the hinge (eg. flanges of pintles, locks, testing means supports or beatings, and the like).

It will anyway be appreciated that all possible minor deviations from the innovative concept as illustrated in the preceding description with reference to the accompanying drawings do not depart from the scope of the present invention as defined in the appended claims.

The invention claimed is:

1. A spherical joint coupling a first member and a second member to be spatially movable relative to each other, the joint comprising:
a spherical head disposed on the first member;
a half-shell shaped accommodation disposed on the second member receiving said head;
a projecting boss being disposed in the head and received in a gap in the accommodation or being disposed in the accommodation and received in a gap in the head, the gap of the head or the gap of the accommodation comprising at least two portions defining a traveling path for the boss;
wherein the head is rotatably retained in the accommodation at at least four points of contact with the accommodation.

2. The spherical joint of claim 1, wherein the traveling path permits rotation of the head relative to the accommodation with respect to two major spatial axes.

3. The spherical joint of claim 2, wherein the axes are orthogonal.

4. The spherical joint of claim 2, wherein the rotations are 90 degrees each.

5. The spherical joint of claim 1, wherein the boss and the gap comprise complementarily shaped surfaces, the surfaces mating with each other to stabilize the relative position of the first and second members.

6. The spherical hinge according to claim 1, wherein said head comprises the gap in which the boss provided in the accommodation of said second member is confined.

7. The spherical hinge according to claim 6, wherein said head is a spherical one and said gap is equal to a fraction of the spherical segment, said boss being a fraction of the spherical segment of a smaller size and confined with a clearance within said gap.

8. The spherical joint of claim 1, wherein when the head comprises the gap, the head comprising a first portion of a first sphere and the gap comprises a second portion of a second sphere, the boss comprises a third portion of a third sphere, a radius of the third sphere and a clearance between the boss and equaling a radius of the first sphere or a radius of the second sphere.

9. The spherical joint of claim 8, wherein when the gap comprises substantially three eighths of the head, the head comprising a shape wherein a semi-sphere and a quarter of the semi-sphere are superpositioned and placed upon the equatorial surface of the semi-sphere and comprising two plane faces that are perpendicular to each other, and wherein the boss comprises one fourth of the semi-sphere and has three exposed faces belonging to three planes that are perpendicular to each other.

10. The spherical joint of claim 9, wherein the first member comprises an elongated body firmly joined to said head, coplanar to said equatorial surface and parallel to a face of said quarter, and wherein said second member comprises a semi-circular collar joined to a half-shell in which there is provided said accommodation, said collar having a semi-circular cavity extending axially to communicate with said accommodation and adapted to receive said elongated body in a position in which said boss, which protrudes from said accommodation in the proximity of said collar, is placed side by side to said quarter.

11. The spherical joint of claim 9, wherein on said equatorial surface there are provided raised ribs that are perpendicular to each other and converge radially into a central semi-sphere that is partially contained in said boss.

12. The spherical joint of claim 11, wherein the boss comprises a recess in each face, the recesses adapted to fit on to corresponding protrusions provided on faces of said quarter.

13. The spherical joint of claim 10, wherein the boss comprises chamfered edges by surfaces that are so shaped as to define concave walls that are complementary to said ribs and convergent towards a concave surface that is complementary to, and resting against, said central semi-sphere formed on said equatorial surface.

14. The spherical joint of claim 9, wherein the head comprises a portion of a sphere, and the gap comprises a continuous surface groove consisting of two equatorial grooves orthogonal to each other, which extend each by an arc of substantially 90 degrees and define two radial walls at the two extremities thereof, and wherein said boss confined with clearance within said gap, has a cross-section corresponding to the width of said grooves.

15. The spherical joint of claim 14, wherein said boss has a cross-sectional shape of substantially a square with concave sides, said boss comprising four concave side walls that are convergent towards a concave terminal surface.

16. The spherical joint of claim 15, wherein said grooves have a constant radial depth, the bottom thereof forming a spherical zone belonging to a sphere having a smaller radius than the head and adapted to move into contact with said concave terminal surface.

17. The spherical joint of claim 16, wherein in the proximity of the radial walls there are provided two convex protrusions adapted to fit in said concave walls.

18. The spherical joint of claim 14, wherein said first member comprises an elongated body that is firmly joined to said head co-planar with a groove and perpendicular to the other groove.

19. The spherical joint of claim 18, wherein the second member comprises a half-shell in which there is provided the accommodation, said accommodation communicating axially with a semi-circular aperture having a smaller radius than the accommodation, which opens in a surface of the half-shell and is adapted to contain said elongated body, said boss being diametrically opposed to said aperture.

20. The spherical joint of claim 19, wherein on the edges of the aperture there are provided two convex projections located diametrically opposed to each other.

21. The spherical joint of claim 20, wherein said gap is a groove provided in said second member, in which a boss integral with said head of said first member is capable of moving.

22. Spectacles comprising:
arms linked in an articulated manner to a front piece by means of a joint, the joint coupling a first member and a second member to be spatially movable relative to each other, the joint comprising:
a spherical head disposed on the first member;
a half-shell shaped accommodation disposed on the second member receiving said head;
a projecting boss being disposed in the head and received in a gap in the accommodation or being disposed in the accommodation and received in a gap in the head, the gap of the head or the gap of the accommodation comprising at least two portions defining a traveling path for the boss;
wherein the head is rotatably retained in the accommodation at at least four points of contact with the accommodation.

* * * * *